(12) United States Patent
Sato (10) Patent No.: US 8,840,955 B2
(45) Date of Patent: Sep. 23, 2014

(54) MAGNETIC RECORDING MEDIUM AND METHOD OF MANUFACTURING SAME

(75) Inventor: Narumi Sato, Nagano (JP)

(73) Assignee: Fuji Electric Co., Ltd. (JP)

( * ) Notice: Subject to any disclaimer, the term of this patent is extended or adjusted under 35 U.S.C. 154(b) by 999 days.

(21) Appl. No.: 12/604,742

(22) Filed: Oct. 23, 2009

(65) Prior Publication Data

US 2010/0103559 A1 Apr. 29, 2010

(30) Foreign Application Priority Data

Oct. 23, 2008 (JP) ................................ 2008-273041

(51) Int. Cl.
*G11B 3/00* (2006.01)
*G11B 5/855* (2006.01)
*B82Y 10/00* (2011.01)
*G11B 5/74* (2006.01)
*G11B 5/82* (2006.01)

(52) U.S. Cl.
CPC *G11B 5/855* (2013.01); *G11B 3/00* (2013.01); *B82Y 10/00* (2013.01); *G11B 5/743* (2013.01); *G11B 5/746* (2013.01); *G11B 5/82* (2013.01)
USPC .......... 427/127; 427/128; 427/129; 427/130; 427/131; 427/132

(58) Field of Classification Search
USPC ................................................ 427/127–132
See application file for complete search history.

(56) References Cited

U.S. PATENT DOCUMENTS

| 6,014,296 A | 1/2000 | Ichihara et al. |
| 2004/0175510 A1 | 9/2004 | Hattori et al. |
| 2005/0284842 A1* | 12/2005 | Okawa et al. ................... 216/22 |
| 2006/0068231 A1* | 3/2006 | Hattori ........................ 428/836.2 |
| 2006/0124585 A1 | 6/2006 | Suwa et al. |
| 2006/0257694 A1* | 11/2006 | Hieda et al. ................... 428/826 |
| 2007/0003798 A1* | 1/2007 | Naito et al. ................ 428/846.2 |

(Continued)

FOREIGN PATENT DOCUMENTS

| JP | 60-029950 A | 2/1985 |
| JP | 05-159285 A | 6/1993 |

(Continued)

OTHER PUBLICATIONS

C.I.Kasei.Co., LTD "NanoTek (R) Ultra-Fine Particles Slurry" <http://www.cik.co.jp/product/nanotek/english/index.html> accessed on Jun. 26, 2012.*

(Continued)

*Primary Examiner* — Mandy Louie
(74) *Attorney, Agent, or Firm* — Rossi, Kimms & McDowell LLP (57) ABSTRACT

A method of manufacturing a magnetic recording medium is disclosed, as well as a magnetic recording medium manufactured by the method. In the manufacturing method, the uneven pattern has magnetic recording elements in protruding portions formed above a substrate, and depressed portions between the recording elements are filled with a filling material. The method allows a high quality magnetic recording medium to be manufactured inexpensively by eliminating the process of removing excess filling material used to fill depressions between magnetic recording elements, because the method allows material to be filled only in the depressed portions of an uneven pattern. The method includes a technique rendering the wettability of the protruding portion surfaces and the depressed portion surfaces different prior to the process of filling with the filling material.

18 Claims, 7 Drawing Sheets

(56) References Cited

U.S. PATENT DOCUMENTS

| | | |
|---|---|---|
| 2007/0031706 A1 | 2/2007 | Okawa et al. |
| 2007/0059562 A1 | 3/2007 | Hattori et al. |
| 2007/0190365 A1* | 8/2007 | Kodama et al. ............... 428/832 |

FOREIGN PATENT DOCUMENTS

| | | | |
|---|---|---|---|
| JP | 05-266465 | * 10/1993 | ............... G11B 5/72 |
| JP | 09-097419 A | 4/1997 | |
| JP | 2005-074774 A | 3/2005 | |
| JP | 2005-100496 A | 4/2005 | |
| JP | 2005-339650 A | 12/2005 | |
| JP | 2006-073087 A | 3/2006 | |
| JP | 2006-082432 A | 3/2006 | |
| JP | 2006-085899 A | 3/2006 | |
| JP | 2006-092659 A | 4/2006 | |
| JP | 2006-196143 A | 7/2006 | |
| JP | 2007-220196 A | 8/2007 | |
| JP | 2008-052304 A | 3/2008 | |

OTHER PUBLICATIONS

Jung et. al. "Electron cyclotron resonance plasma etching of materials for magneto-resistive random access memory applications" Journal of Ele. Mats. vo. 26, No. 11, 1997 p. 1310-1313.*

Hermansson et. al. "Wetting properties of silicon surfaces" Solid state Sensors 1991, p. 193-196.*

Japanese Office Action issued in corresponding application No. JP2008-273041 dated Apr. 24, 2012. English translation provided.

Japanese Office Action issued in Japanese counterpart application No. JP2008-273041, dated Dec. 28, 2012. English translation provided.

* cited by examiner

Protruding portions (light areas in image):
Magnetic recording elements and protective layer Protruding portions (light areas in image):
Magnetic recording element and protective layer Protruding portions (light areas in image):
Magnetic recording element and protective layer

Portions where fluorine detected (light areas in image)

Portions where fluorine is detected
(Light areas in image)

Portions where fluorine is detected
(Light areas in image)

Portions where fluorine is detected
(Light areas in image)

Fig. 7

MAGNETIC RECORDING MEDIUM AND METHOD OF MANUFACTURING SAME

BACKGROUND OF THE INVENTION

A. Field of the Invention

This invention relates to a magnetic recording medium and a method of manufacturing such a medium, and more specifically relates to a magnetic recording medium in which is formed an uneven pattern, the protruding portions of which comprise magnetic recording elements, and to a method of manufacturing such a medium.

B. Description of the Related Art

Magnetic disk drives are expanding into new application areas and tending toward smaller sizes, and ever-higher recording densities are being demanded of the magnetic recording media mounted in such drives.

A magnetic recording medium comprises magnetic layers and other thin films formed on substrates of aluminum or glass. In response to the above demand there have been unceasing efforts to raise recording densities, by making the magnetic particles comprised by the recording layer finer, modifying materials, reducing magnetic spacing (the distance between the magnetic head and the medium) through improved substrate smoothness, by improvements in the micromachining of magnetic heads, and in various other engineering areas.

However, erroneous writing to areas other than the target track (adjacent tracks) arising from spreading of the recording magnetic field of the magnetic head, as well as crosstalk during reading and other problems have emerged, and limits have appeared to the recording densities achievable through the techniques for improvements used in the past.

On the other hand, a discrete track medium and a patterned medium, in which the recording layer is formed with an uneven pattern in which the protruding portions form recording elements, have been proposed as candidates for magnetic recording media enabling still higher recording densities (see for example Japanese Patent Application Laid-open No. 9-97419). In the case of such magnetic recording media, from the standpoint of magnetic head flying stability, it is thought to be preferable that the depressed portions between the recording elements be filled with a nonmagnetic filling material, and that the upper faces of the recording elements and filling material be made smooth.

Sputtering, CVD, IBD (Ion Beam Deposition), or other dry processes for film deposition may be used as the method of filling the depressed portions with the filling material, for example (see, for example Japanese Patent Application Laid-open No. 2006-85899). Methods may also be used in which a material enabling selection of a fluid state or a hardened state is used, so that, for example, after depositing a film in a fluid state using spin-coating, heating is performed to harden the film (see, for example, Japanese Patent Application Laid-open No. 2005-100496).

Further, in Japanese Patent Application Laid-open No. 2006-92659, by forming a film of a material in a fluid state which enables selection of a fluid state or hardened state as a nonmagnetic member, and filling the depressed portions of the uneven pattern with the nonmagnetic material, depressions and protrusions in the surface of the nonmagnetic material formed following the uneven shape of the recording layer can be reduced.

However, regardless of the method used, it is difficult to selectively fill only depressed portions, and the filling pattern is deposited along the original depressions and protrusions. Hence, if a process is not performed in which filling is stopped at the time at which depressed portions are filled up to substantially the height of the original protruding portions or a greater height, and then the unnecessary filling material on the protruding portions is removed, then a substantially flat surface which can withstand magnetic head flight cannot be obtained.

An ion beam etching method, CMP method, or other machining method can be used as the flattening method (see, for example, Japanese Patent Application Laid-open No. 2006-196143), but in addition to the increase in the number of processes, there are problems with the current technologies.

First, in ion beam etching methods, efforts are made to incline the ion beam gun slightly with respect to the main surface which is to be machined, as a means of selectively removing protruding portions. As a result, a huge amount of time is required for etching. In addition, etching of portions other than protruding portions occurs even at a slow etching rate, so that a completely flat surface is not obtained. Moreover, for reasons of the device configuration, simultaneous processing of numerous surfaces is difficult, and so such a method is extremely unsuitable with respect to productivity.

The CMP method can be used to process tens to hundreds of surfaces at once, and is already used in processes to polish substrates for magnetic recording media. However, because thicknesses differ slightly among substrates, if such substrates are polished together, different polished amounts for different substrates result. Hence a process of selecting substrates in advance by thickness becomes necessary. Further, it is not possible to exercise control sufficient to enable polishing of only the protruding portions of numerous surfaces simultaneously with precision on the order of several nanometers, so that once again there are problems with productivity.

The present invention is directed to overcoming or at least reducing the effects of one or more of the problems set forth above.

SUMMARY OF THE INVENTION

This invention was devised in light of the above problems and provides a method of manufacturing a magnetic recording medium. In the method of manufacture an uneven pattern having magnetic recording elements in protruding portions is formed above a substrate and depressed portions between the recording elements are filled with a filling material. The method is characterized in comprising a process, prior to the process of filling with the filling material, of causing the "wettability" of surfaces the protruding portions and surfaces of the depressed portions to be different. Further, a magnetic recording medium of this invention is characterized in having been manufactured by this method of manufacture.

According to a method of manufacturing a magnetic recording medium of this invention, if a fluid material with low affinity with the protruding portion surfaces and with high affinity with the depressed portion surfaces is used as the filling material, then by causing this filling material to adhere to the surface of the magnetic recording medium, the filling material remains in only the depressed portions to fill these portions.

By this means, a process of removing excess filling material, which has been performed in the past, can be eliminated, and a high quality magnetic recording medium can be manufactured inexpensively.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

A magnetic recording medium manufactured by a method of this invention is a discrete track medium or a patterned medium in the recording layer of which an uneven pattern has been formed, with recording elements formed in the protruding portions thereof.

In a method of manufacturing this invention, prior to the process of filling depressed portions with filling material, a process of causing the "wettability" of the protruding portion surfaces and depressed portion surfaces to be different is provided.

Here, "wettability" refers to the property by which, when a liquid is dripped onto a solid surface, the liquid spreads over the solid surface while pushing aside gas; when the liquid is hydrophilic, if the solid surface is hydrophilic then the wettability for the liquid is high, and when the liquid is hydrophobic, if the solid surface is hydrophobic then the wettability for the liquid is high.

That is, in this invention it is sufficient to render one among the protruding portion surfaces and the depressed portion surfaces hydrophilic, and the other hydrophobic, in order to cause the wettability" of the protruding portion surfaces and depressed portion surfaces to be different. The protruding portion surfaces may be rendered hydrophilic and the depressed portion surfaces hydrophobic, or the protruding portion surfaces may be rendered hydrophobic and the depressed portion surfaces hydrophilic.

If, when the depressed portion surfaces are made hydrophobic, a hydrophobic material is used as the filling material, and when the depressed portion surfaces are made hydrophilic a hydrophilic material is used as the filling material, then filling material remains only in depressed portions upon filling, and because the wettability of the protruding portion surfaces is different, filling material does not readily adhere to protruding portion surfaces.

A fluorine material may be used as an etching gas to perform dry etching to remove the mask as one method of rendering protruding portion surfaces hydrophobic, after which processing with the fluorine system is continued to render protruding portion surfaces hydrophobic. An $F/N_2$ gas mixture, $CF_4$, or similar can be used as the fluorine material.

Or, after performing etching using a well-known method without using a fluorine system gas, the substrate may for example be exposed to fluorine system gas within a plasma treatment device to render the protruding portion surfaces hydrophobic.

As a method of exposing only protruding portion surfaces to a fluorine system gas to render the surfaces hydrophobic (without rendering the depressed portion surfaces hydrophobic), a method can be used in which a material which reacts less readily with the fluorine system gas than does the material forming the magnetic recording elements is formed in advance on the surface of the layer comprising the soft magnetic layer, and the conditions for exposure to the fluorine system gas are comparatively mild conditions, such that the fluorine system gas reacts only with the protruding portion surfaces.

Ru, Au, Pt, or other rare metals can be used a material which reacts less readily with the fluorine system gas than does the material forming the magnetic recording elements, for example.

A method in which water comprising fine colloidal particles is used to fill the depressed portions between the recording elements with the colloidal particles can be used as a method of filling the depressed portions, the surfaces of which are hydrophilic, with filling material. Colloidal silica can be used as the colloidal particles, for example.

If a fluid material having high affinity with the depressed portion surfaces is used as the filling material, such as, for example, a fluid material with hydrophobic properties when the depressed portion surfaces are hydrophobic, is used, then the material does not readily adhere to protruding portion surfaces having different affinity, but readily adheres within the depressed portions. Here, "fluidity" means able to move fluidly when the filling material fills depressed portions, and does not mean that the fluid property must be maintained indefinitely. For example, in order that colloidal particles and fine powder extends into corners of the depressed portions, it is important that the material have fluid properties in a state of dispersion in water; in the state in which the colloidal particles and fine powder are accumulated in depressed portions, fluid properties are no longer preferable.

It is preferable that a protective layer be provided on the surface of the uneven pattern after depressed portions have been filled with the filling material. This protective layer improves corrosion resistance and durability of the magnetic recording medium. Generally carbon may be used for the protective layer, and deposition methods generally including sputtering and CVD methods, but any method may be used which enables deposition of a fine and hard film.

Next, an aspect of a magnetic recording medium of this invention is explained.

Figure 6A:
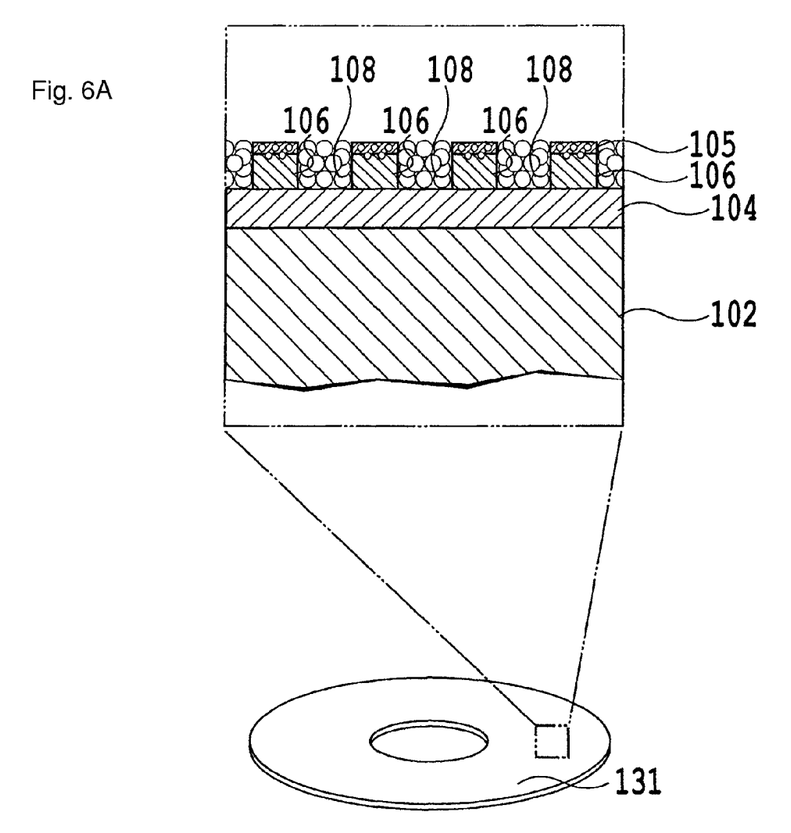
FIG. 6 schematically shows a magnetic recording medium, the depressed portions of the uneven pattern of which have been filled with colloidal silica.
Figure 6B:
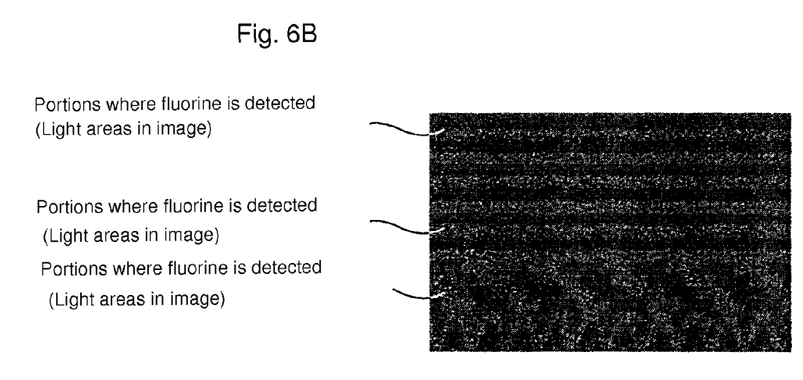

FIG. 6 schematically shows a magnetic recording medium in which a prescribed uneven pattern is formed. In the magnetic recording medium shown in FIG. 6, an uneven pattern, having magnetic recording elements 106 in protruding portions, is formed on substrate 102, with layer 104 comprising a well-known soft magnetic layer intervening as a soft magnetic backing layer of a perpendicular magnetic recording medium. Protective layer 105 is formed on magnetic recording elements 106, and the depressed portions of the uneven pattern are filled with filling material comprising colloidal silica 108. Magnetic recording elements 106 result from division of magnetic recording layer 103 of FIG. 1, described below, into a prescribed uneven pattern.

A flat substrate the parent material of which is glass or aluminum is used as substrate 102.

It is preferable that magnetic recording elements 106 (magnetic recording layer 103) have a thickness of approximately 5 to 50 nm; as the material forming the magnetic recording elements 106, a CoCr alloy or similar can be used.

It is preferable that layer 104 comprising the soft magnetic layer have a thickness of approximately 20 to 300 nm. A Co alloy, an Fe alloy, or similar can be used as the material forming the soft magnetic layer. Layer 104 comprising the soft magnetic layer may comprise only a soft magnetic layer, or, in addition to a soft magnetic layer, may comprise a precious metal layer or other layer.

It is preferable that protective layer 105 have a thickness of approximately 10 nm or less. Any material normally used to form a protective layer can be employed as the material forming protective layer 105; however, as examples, carbon materials are preferable, and in particular hard carbon films of material called diamond-like carbon are preferable.

The surfaces of magnetic recording elements 106 (protruding portions of the uneven pattern), which have protective layer 105 thereupon, are rendered hydrophobic by exposure to fluorine system gas. FIG. 6 schematically shows the adhesion of fluorine, resulting in hydrophobic properties, in portions indicated by small circles of the surface layer of magnetic recording elements 106 and protective layer 105; depressed portion surfaces are not rendered hydrophobic, and are hydrophilic compared with protruding portion surfaces. That is, the wettability of the protruding portion surfaces and depressed portion surfaces are different. FIG. 6 shows the result of immersion of this magnetic recording medium in an aqueous solution of colloidal silica, which is hydrophilic, and elimination of water. The hydrophilic colloidal silica adheres only to the depressed portions, and does not readily adhere to the protruding portion surfaces, which are hydrophobic.

Figure 7:
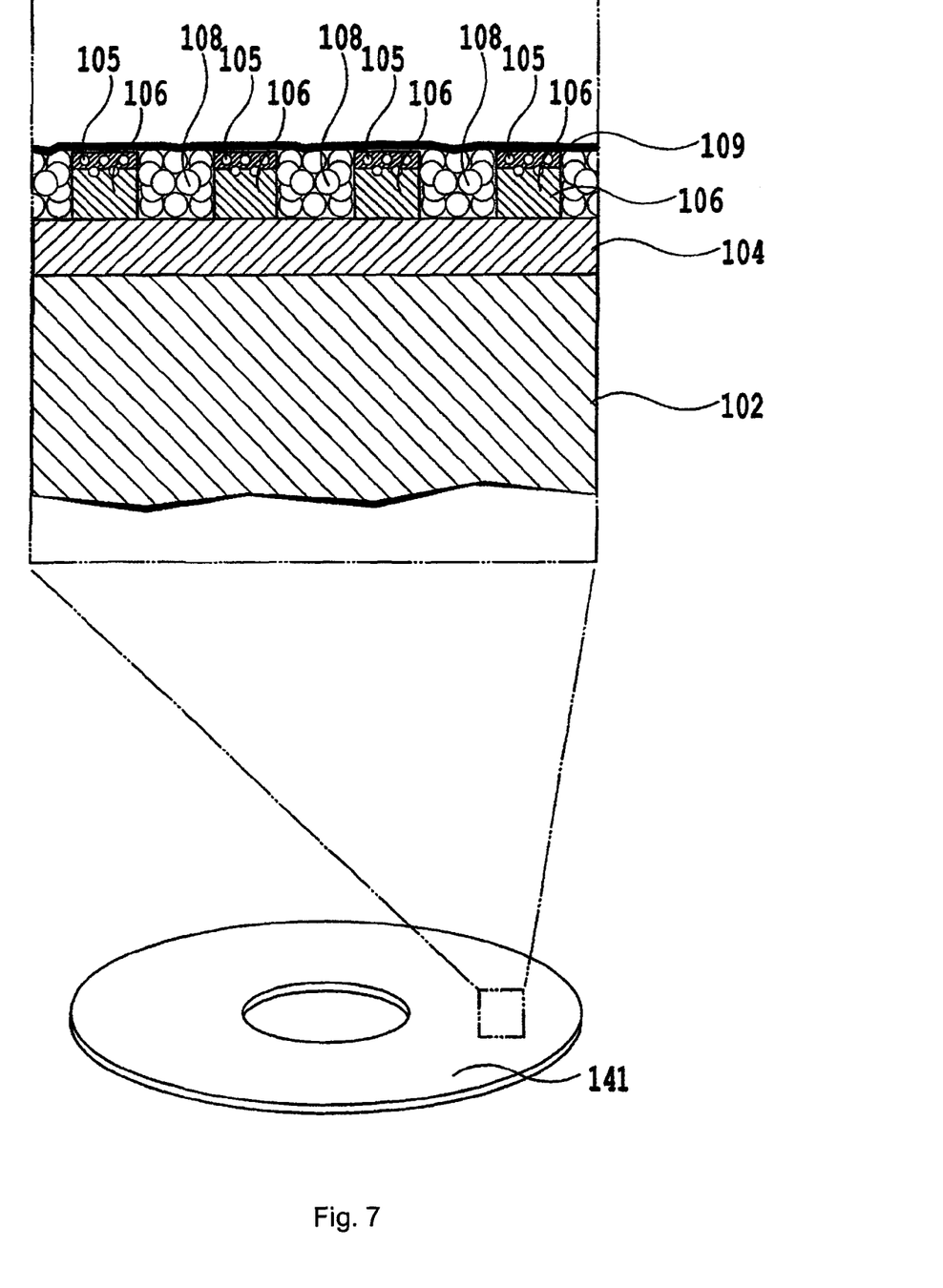
FIG. 7 shows a state in which a protective layer has been deposited on the uppermost surface of a magnetic recording medium, the depressed portions of the uneven pattern of which have been filled with colloidal silica.

FIG. 7 shows an example of deposition of protective layer 109 on the surface of the magnetic recording medium, the depressed portions of which have been filled with a filling material. By depositing protective layer 109, corrosion resistance and durability of the magnetic recording medium can be improved.

Embodiment 1

Figure 1:
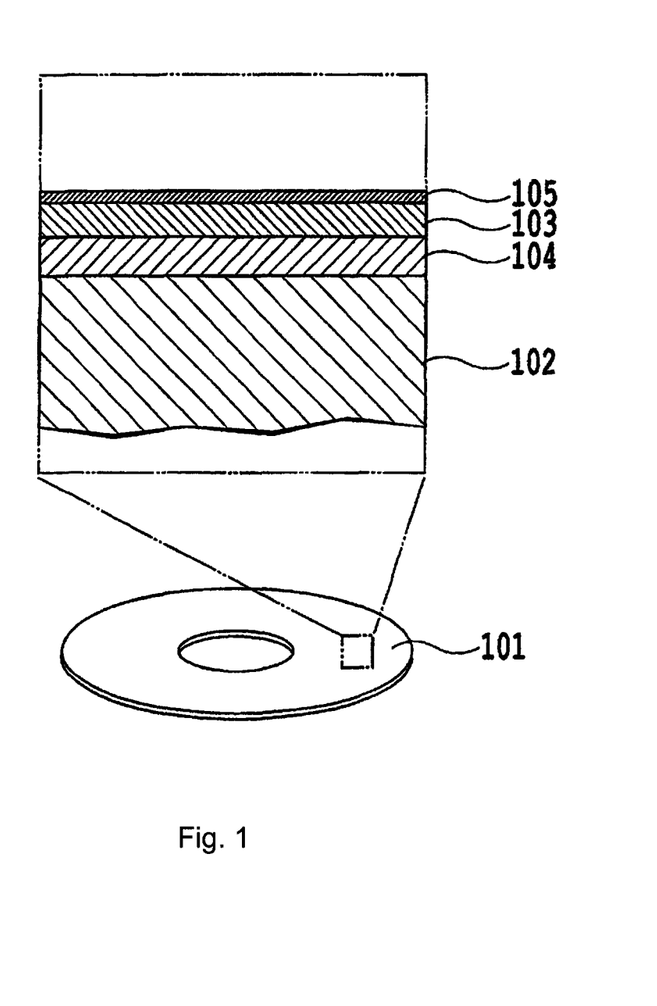
FIG. 1 schematically shows a magnetic recording medium prior to forming an uneven pattern.

A disk for processing 101 such as shown in FIG. 1, in which layer 104 (of thickness 200 nm) comprising a soft magnetic layer of Fe alloy was formed on substrate 102 of glass, with magnetic recording layer 103 of thickness 40 nm of CoCr alloy formed thereupon, and having protective layer 105 of thickness 5 nm comprising diamond-like carbon, was prepared. Layer 104 comprising the soft magnetic layer had a layer of Ru formed on the surface.

Figure 2:
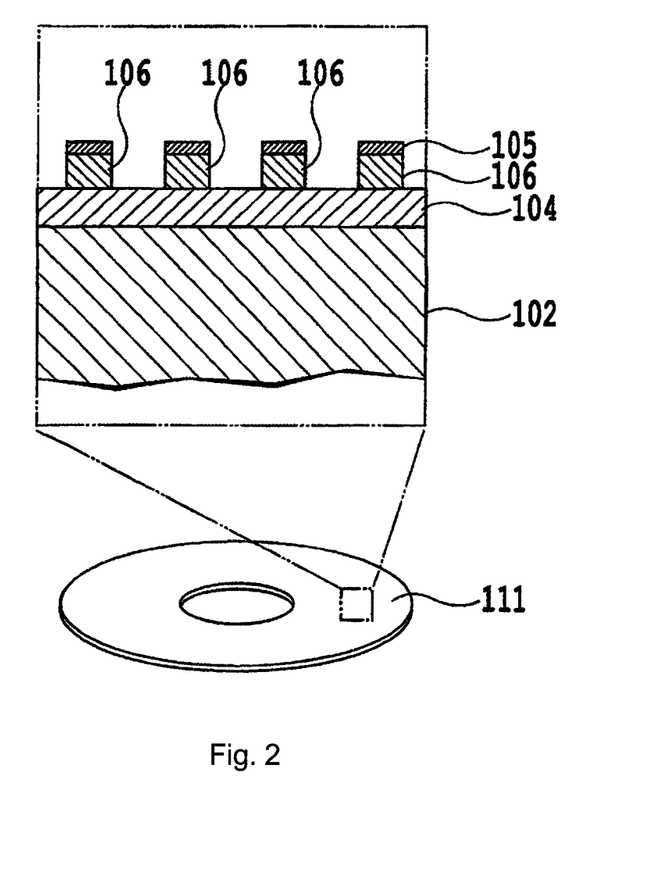
FIG. 2 schematically shows a magnetic recording medium in the stage in which a prescribed uneven pattern has been formed.

An uneven pattern was transferred onto this disk for processing 101, after which dry etching was performed to divide the magnetic recording layer 103 and protective layer 105 into numerous magnetic recording elements 106 by means of a prescribed uneven pattern, as shown in FIG. 2.

Figure 3:
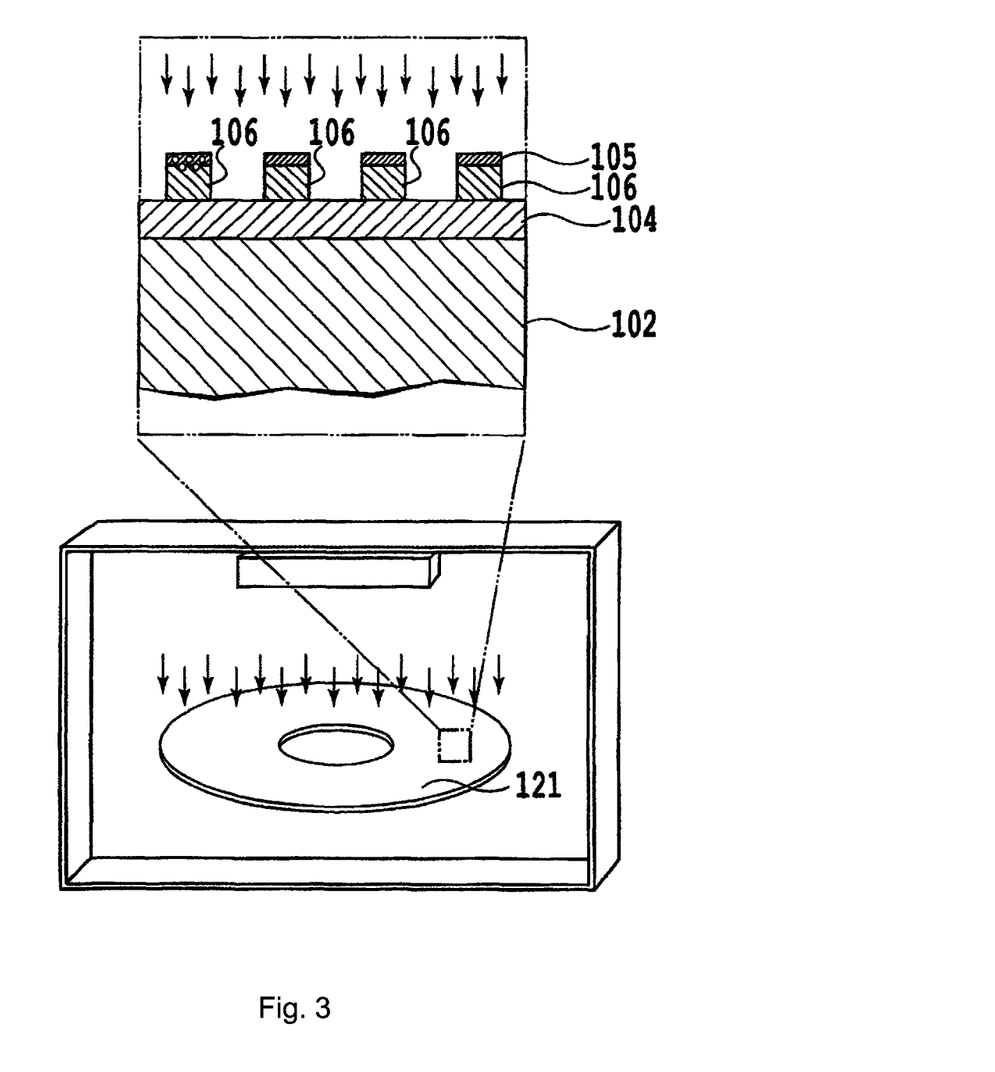
FIG. 3 schematically shows a magnetic recording medium exposed to fluorine system gas in a vacuum plasma treatment device.

Next, the disk for processing 111, on which magnetic recording layer 103 and protective layer 105 have been divided into numerous magnetic recording elements 106, was exposed to fluorine system gas in a vacuum plasma processing device, shown in FIG. 3. In this embodiment, the gas used was $CF_4$, at a gas pressure of 1 Pa and flow rate of 30 sccm, and the processing time was 25 seconds.

Figure 4A:
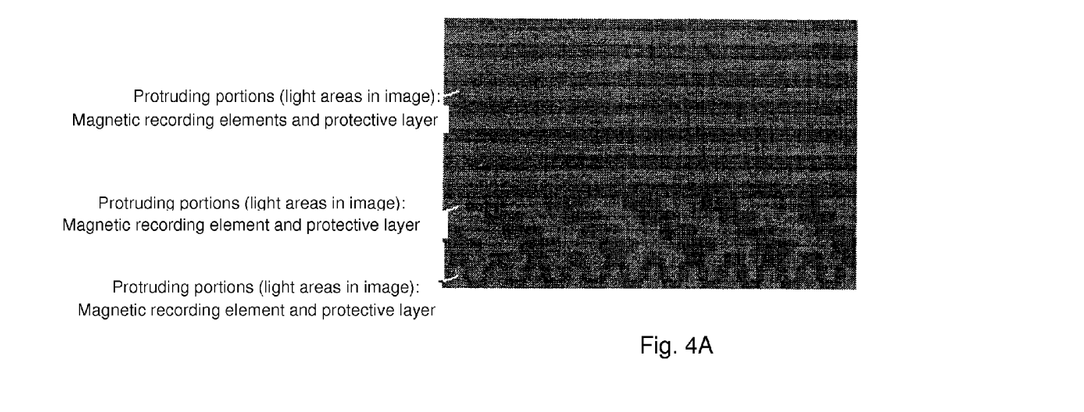
FIG. 4 shows an uneven pattern and fluorine detection portion of a magnetic recording medium.
Figure 4B:
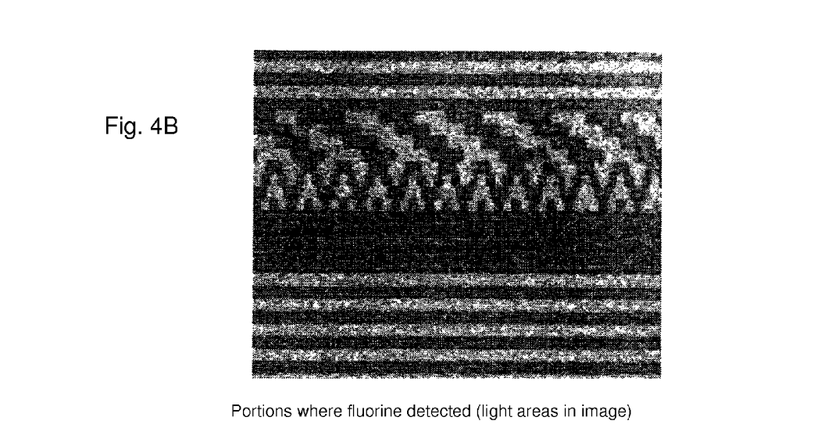

As a result of surface analysis by Auger spectroscopic analysis of the disk for processing 121, the surface of which was exposed to fluorine system gas in this way, fluorine was detected only on the surfaces of protective layer 105 and magnetic recording elements 106, as shown in FIG. 4, and hydrophobic properties were exhibited. On the other hand, fluorine was not detected on the surfaces of layer 104 comprising the soft magnetic layer.

Figure 5:
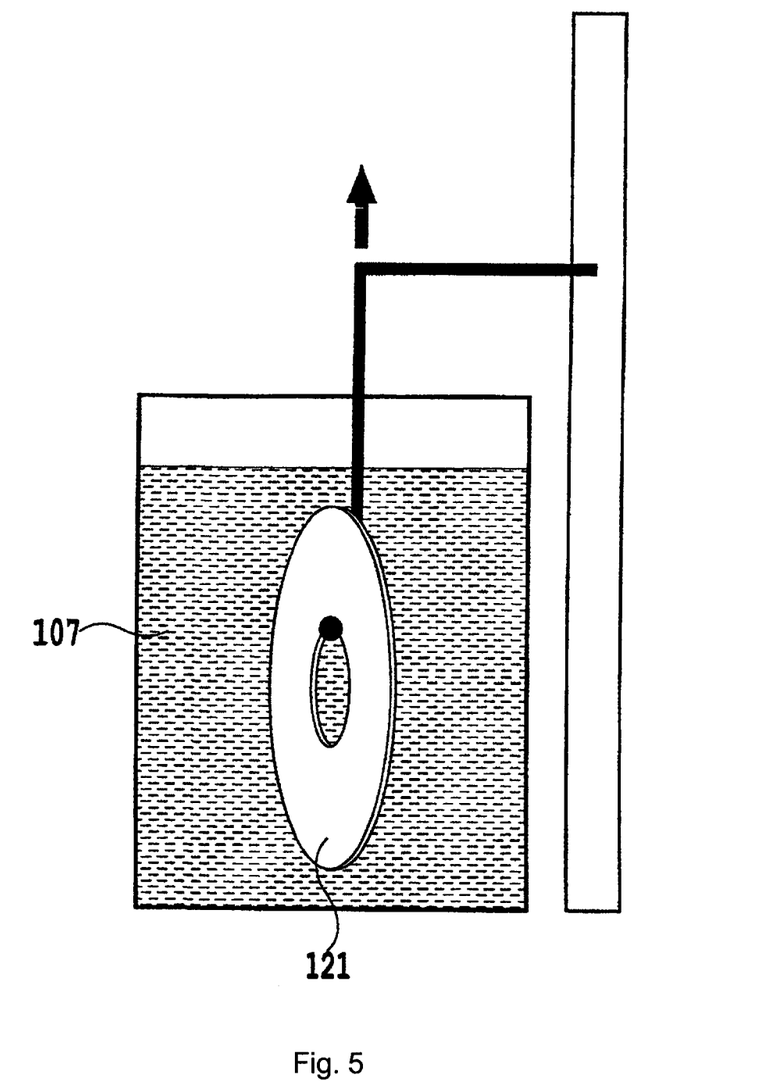
FIG. 5 shows immersion in a colloidal silica aqueous solution and removal of a disk for treatment the surface of which has been exposed to fluorine system gas.

Next, as shown in FIG. 5, the disk for processing 121, the surface of which was exposed to fluorine system gas, was immersed in an aqueous solution of colloidal silica 107 of parameter diameter 20 nm, and then lifted at a constant speed of 1 mm/sec, to apply a colloidal silica aqueous solution to the surface of the disk for processing 121.

As a result of surface analysis with an electron microscope of a disk for processing 131 onto the surface of which a colloidal silica aqueous solution was applied in this way, colloidal silica 108 adhered to and filled only the depressed portions, but did not adhere at all to magnetic recording elements 106, as shown in FIG. 6.

From the above, it is seen that by changing the wettability of the protruding portions and depressed portions of an uneven pattern, it is possible to selectively fill only the depressed portions with filling material.

Protective layer 109 comprising hard carbon was deposited by sputtering onto the uppermost surface of the disk for processing 131 with the colloidal silica aqueous solution applied onto the surface. This state (disk for processing 141) is shown in FIG. 7.

By means of this invention, a method of manufacturing a magnetic recording medium can be provided which enables efficient filling of only depressed portions with a filling material, without requiring a process of removing excess filling material.

Thus, a magnetic recording medium and a method of manufacturing such a medium have been described according to the present invention. Many modifications and variations may be made to the techniques and structures described and illustrated herein without departing from the spirit and scope of the invention. Accordingly, it should be understood that the methods and media described herein are illustrative only and are not limiting upon the scope of the invention.

This application is based on and claims priority to Japanese Patent Application 2008-273041, filed on Oct. 23, 2008. The disclosure of the priority application in its entirety, including the drawings, claims, and the specification thereof, is incorporated herein by reference.

What is claimed is:

1. A method of manufacturing a magnetic recording medium, comprising producing a medium with an uneven pattern comprising magnetic recording elements which protrude and depressed portions between the protruding magnetic recording elements, comprising:
treating surfaces of the depressed portions and the protruding magnetic recording elements such that they differ in wettability, and then
filling the depressed portions with a filler which does not adhere to the protruding magnetic recording elements.

2. The method of manufacturing a magnetic recording medium according to claim 1, wherein the treating to render the wettability of the surface of the magnetic recording element different from the wettability of the surface of the depressed portions makes the surface of the protruding magnetic recording elements hydrophobic.

3. The method of manufacturing a magnetic recording medium according to claim 2, wherein the treating comprises using a fluorine-containing material as an etching gas, and forming the uneven pattern by dry etching.

4. The method according to claim 2, further comprising filling the depressed portions with a hydrophilic filling material after treating the medium.

5. The method according to claim 3, further comprising filling the depressed portions with a hydrophilic filling material after treating the medium.

6. The method of manufacturing a magnetic recording medium according to claim 4, wherein the filling with the filling material uses water containing fine colloid particles to fill depressions between the recording elements with the colloid particles.

7. The method of manufacturing a magnetic recording medium according to claim 5, wherein the filling with the filling material uses water containing fine colloid particles to fill depressions between the recording elements with the colloid particles.

8. The method of manufacturing a magnetic recording medium according to claim 6, wherein a protective layer is provided on a surface of the uneven pattern.

9. The method of manufacturing a magnetic recording medium according to claim 7, wherein a protective layer is provided on a surface of the uneven pattern.

10. A method of manufacturing a magnetic recording medium comprising:
   preparing a substrate comprising a magnetic recording layer;
   producing an uneven pattern in the substrate comprising magnetic recording elements which protrude and depressed portions between the protruding magnetic recording elements;
   treating surfaces of the depressed portions and the protruding magnetic recording elements such that they differ in wettability;
   filling the depressed portions with a filler which does not adhere to the protruding magnetic recording elements; and
   forming a protective layer on the filler and the magnetic recording elements, wherein the protective layer is formed directly after filling the depressed portions with the filler.

11. The method of manufacturing a magnetic recording medium according to claim 10, wherein the surfaces of the depressed portion are hydrophobic, and a hydrophobic material is used as the filling material.

12. The method of manufacturing a magnetic recording medium according to claim 10, wherein the surfaces of the depressed portion are hydrophilic, and a hydrophilic material is used as the filling material.

13. The method according to claim 10, wherein the uneven pattern is formed by etching.

14. The method according to claim 13, wherein the etching simultaneously treats the medium to produce a difference in wettability between the surfaces of the depressed portions and the protruding magnetic recording elements.

15. The method according to claim 13, wherein the medium is subjected to a separate treatment with a fluorine-containing gas after the etching to render the surfaces of the protruding magnetic recording elements hydrophobic.

16. A method of manufacturing a magnetic recording medium, comprising:
   preparing a substrate comprising a magnetic recording layer;
   producing an uneven pattern in the substrate by etching the magnetic recording layer on the substrate with a fluorine-containing gas to produce protruding portions comprising the magnetic recording layer and depressed portions between the protruding portions where the magnetic recording layer has been removed by the etching, wherein after the etching the protruding portions are hydrophobic and the depressed portions are hydrophilic; and
   filling the depressed portions with a hydrophilic filling material.

17. The method according to claim 11, wherein the surface of the recording elements are hydrophilic.

18. The method according to claim 12, wherein the surface of the recording elements are hydrophobic.

* * * * *